United States Patent
Paulraj et al.

(10) Patent No.: US 12,099,417 B1
(45) Date of Patent: Sep. 24, 2024

(54) SYSTEM AND METHOD FOR DETECTING DEVIATION OF COMPONENT LIFE EXPECTANCY AGAINST MEAN TIME TO FIRST FAILURE

(71) Applicant: Dell Products L.P., Round Rock, TX (US)

(72) Inventors: Deepaganesh Paulraj, Bangalore (IN); Min Gong, Shanghai (CN); Ashok Narayanan Potti, Bangalore (IN); Dale Wang, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/302,292

(22) Filed: Apr. 18, 2023

(51) Int. Cl.
*G06F 11/14* (2006.01)
*G06F 11/07* (2006.01)

(52) U.S. Cl.
CPC ...... *G06F 11/1471* (2013.01); *G06F 11/0709* (2013.01)

(58) Field of Classification Search
CPC .......... G06F 11/1471; G06F 11/0709
See application file for complete search history.

(56) References Cited

U.S. PATENT DOCUMENTS

| | | | |
|---|---|---|---|
| 8,538,897 B2 | 9/2013 | Han et al. | |
| 10,572,329 B2 | 2/2020 | Harutyunyan et al. | |
| 10,740,793 B1 | 8/2020 | Sussman et al. | |
| 10,776,196 B2 | 9/2020 | Ohana et al. | |
| 10,853,867 B1 | 12/2020 | Bulusu et al. | |
| 11,513,930 B2 | 11/2022 | Chan et al. | |
| 11,720,940 B2 | 8/2023 | Lakshminarayan et al. | |
| 11,734,102 B1 * | 8/2023 | Wang | G06F 11/079 714/26 |
| 11,909,836 B2 | 2/2024 | Wulf et al. | |
| 2009/0113248 A1 | 4/2009 | Bock et al. | |
| 2009/0216910 A1 | 8/2009 | Duchesneau | |
| 2010/0257058 A1 | 10/2010 | Karidi et al. | |
| 2010/0318856 A1 | 12/2010 | Yoshida | |

(Continued)

FOREIGN PATENT DOCUMENTS

| | | |
|---|---|---|
| CN | 108280168 A | 7/2018 |
| CN | 111476371 A | 7/2020 |

(Continued)

*Primary Examiner* — Nadeem Iqbal
(74) *Attorney, Agent, or Firm* — Womble Bond Dickinson (US) LLP

(57) ABSTRACT

Methods and systems for managing data processing systems are disclosed. A data processing system may include and depend on the operation of hardware and/or software components. To manage the operation of the data processing system, a data processing system manager may obtain logs for components of the data processing system. The logs may record information that describe and reflect the historical and/or current operation of these components. Inference models may be implemented to predict likely future component failures (e.g., a predicted mean time to first failure (MTFF) of the components) using information recorded in the logs and component specification information from component vendors. The likely future component failures may be analyzed to reduce the likelihood of the data processing system becoming impaired.

20 Claims, 10 Drawing Sheets

(56) References Cited

U.S. PATENT DOCUMENTS

| | | |
|---|---|---|
| 2013/0041748 A1 | 2/2013 | Hsiao et al. |
| 2013/0198240 A1 | 8/2013 | Ameri-Yahia et al. |
| 2015/0227838 A1 | 8/2015 | Wang et al. |
| 2015/0288557 A1 | 10/2015 | Gates et al. |
| 2019/0095313 A1 | 3/2019 | Xu et al. |
| 2019/0129785 A1 | 5/2019 | Liu et al. |
| 2020/0026590 A1 | 1/2020 | Lopez et al. |
| 2021/0027205 A1 | 1/2021 | Sevakula et al. |
| 2021/0241141 A1 | 8/2021 | Dugger et al. |
| 2022/0100187 A1 | 3/2022 | Isik et al. |
| 2022/0283890 A1 | 9/2022 | Chopra et al. |
| 2022/0358005 A1 | 11/2022 | Saha et al. |
| 2022/0417078 A1 | 12/2022 | Matsuo et al. |
| 2023/0016199 A1 | 1/2023 | Jividen et al. |
| 2024/0028955 A1* | 1/2024 | Harutyunyan ........... G06N 5/04 |

FOREIGN PATENT DOCUMENTS

| | | |
|---|---|---|
| CN | 112541806 A | 3/2021 |
| EP | 4235505 A1 | 8/2023 |

* cited by examiner

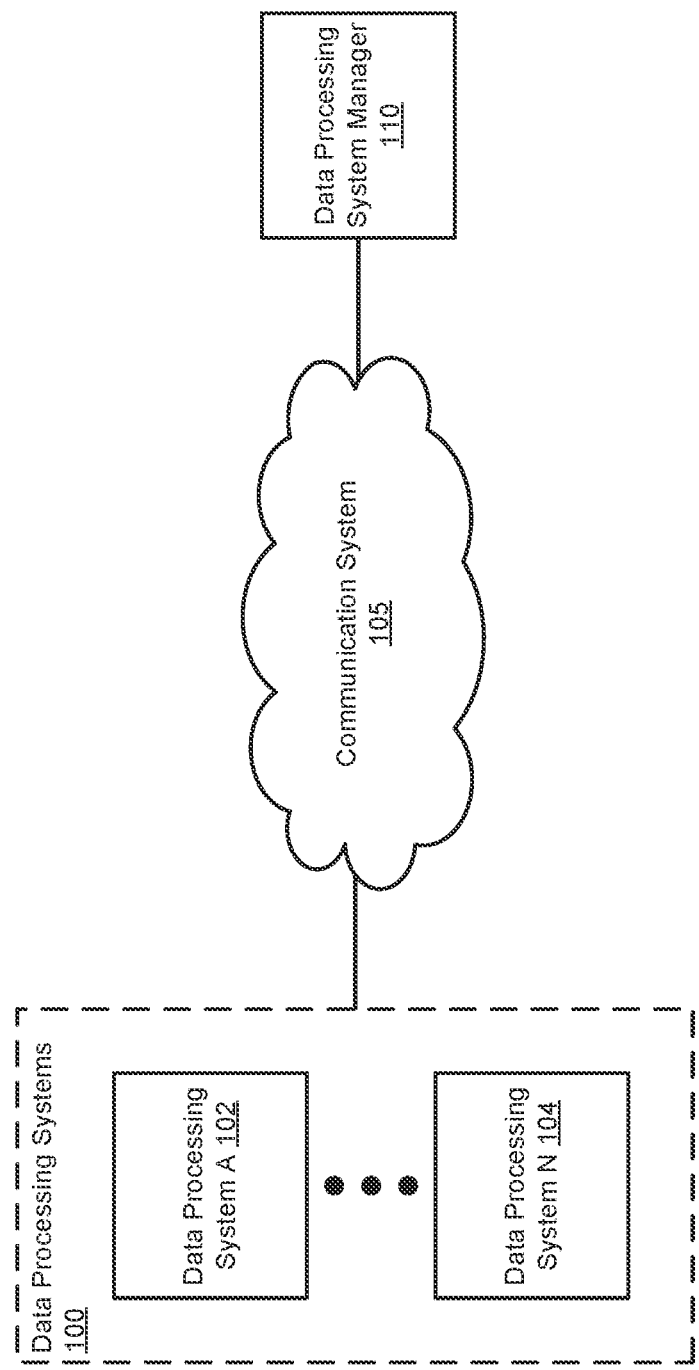

Data Table 250

| Series of Actions (Log Segment) | Actual MTFF (Days) | Provider-Specified-MTFF (Days) | Component ID |
|---|---|---|---|
| HHHHHAAAAHAHAHHHAAHH | 1000 | 1050 | C1 |
| HHAAAAAHAHAHAHHAAAAHAAHA | 1200 | 1050 | C1 |
| AHAAHAHHAAAAHAHAHAHH | 1100 | 1050 | C1 |
| AAAHAAHHAAAAAHAAHAHHAAAAAHAAHA | 800 | 1050 | C1 |
| AHAAHAHAHHAAAAAHHAAAAAHHAAAAHAHAAHAHH | 2000 | 1050 | C1 |
| ... | ... | ... | ... |

SYSTEM AND METHOD FOR DETECTING DEVIATION OF COMPONENT LIFE EXPECTANCY AGAINST MEAN TIME TO FIRST FAILURE

FIELD

Embodiments disclosed herein relate generally to device management. More particularly, embodiments disclosed herein relate to systems and methods to manage the operation of devices to meet operational goals

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIG. 2D shows an example of log data in accordance with an embodiment.

DETAILED DESCRIPTION

Figure 2A:
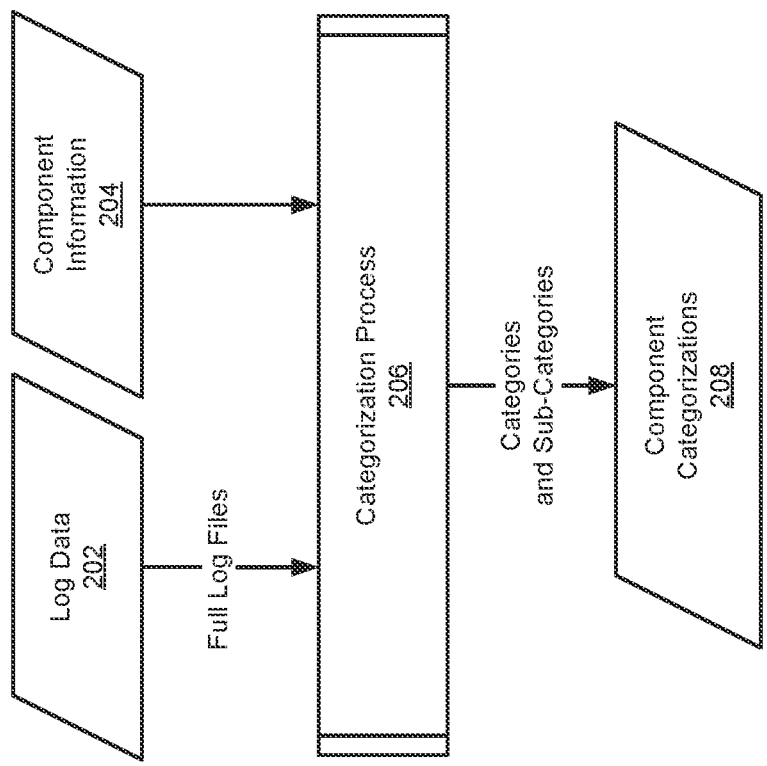
FIG. 2A shows a data flow diagram illustrating a process of obtaining component categorizations in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems based on indications of a failure (e.g., a mean time to first failure (MTFF, sometimes MTFF) of one or more components of the data processing systems). A data processing system may include one or more hardware and/or software components. The operation of the data processing system may depend on the operation of these components. For example, improper operation of any of these components may impair (e.g., reduce performance, reduce functionality, etc.) the operation of the data processing system and/or contribute to a system failure.

To manage the operation of the data processing system, the system may include a data processing system manager. The data processing system manager may obtain log files for data processing systems reflecting the historical operation of these data processing systems. The historical log files may be used (e.g., in conjunction with component specification information provided by a vendor, designer, and/or manufacturer of a component) to predict the future operation of the data processing system (e.g., to predict the MTFF of a component that may result in a future undesired operation of the data processing system), and/or to provide other functions.

Log data from the log files may be analyzed using machine learning to obtain various types of inference models. The inference models may be used in sequence and/or conjunction to identify potential component failures (e.g., predicted MTFF of a component) in large amounts of log data (e.g., ingest data).

In particular, to improve mitigation and/or prevention measures, component failure information such as a component's MTFF may be predicted for each component of a data processing system. The component's MTFF may be predicted using inference models (as discussed in more detail below in connection with FIGS. 2A-3B). A trained inference model may analyze large volumes of log data and component specification information to predict (e.g., using patterns in log messages that relate to a component failure, and/or subsequent component failures) a component's MTFF. The log segments may describe a series of actions (e.g., performed by a user), reactions (e.g., of the data processing system to the user actions), and/or health events (e.g., warnings).

By doing so, an improved computing device and/or distributed system that is able to determine whether a component is on the right track to meet the component specification information (e.g., a vendor, designer, and/or manufacturer specified MTTF (collectively referred to as a "component-provider-specified MTFF" herein) of the component) may be obtained. The improved device and/or system may have higher uptime and/or may be more resilient to impairment because the component can be swapped out (e.g., replaced) before the predicted MTTF.

In an embodiment, a method for managing data processing systems is disclosed. The method may include obtaining a new log segment for a hardware component of a data processing system of the data processing systems; identifying a type of the hardware component; identifying an inference model associated with the type of the hardware component; obtaining, using the inference model and the log, an inference indicating a predicted deviation of the actual time to failure for the hardware component from a mean time to first failure (MTFF) for the hardware component; and performing a remediation action based on the deviation of the actual time to failure for the hardware component to manage an impact of a future failure of the hardware component.

Performing the remediation action may include in a first instance performing the remediation action where the deviation is a negative outlier lifetime: identifying a nominal scheduling for replacement of the hardware component ahead of the MTFF; and scheduling replacement of the hardware component ahead of the nominal scheduling.

Performing the remediation action may include in a second instance of performing the remediation action where the deviation is a positive outlier lifetime: identifying a nominal scheduling for replacement of the hardware component ahead of the MTFF; and scheduling replacement of the hardware component after the nominal scheduling.

The inference model may be based on training data that includes records, each record including: a log sequence for one of multiple hardware components of the type of the hardware component that have previously failed; and a cluster (or cluster label) of clusters.

The clusters may be based on a clustering of second records for a type of hardware component, each the second record may include the log sequence for the one of multiple hardware components of the type of the hardware component that have previously failed; and an actual time to first failure for the one of multiple hardware components.

The clusters may include at least three clusters. A first of the three clusters may include a first portion of the second records that each have an actual time to first failure that is less than the MTFF for the type of the hardware component below a first threshold. A second of the three clusters may include a second portion of the second records that each have an actual time to first failure that is within the first threshold of the MTFF for the type of the hardware component. A third of the three clusters may include a third portion of the second records that each have an actual time to first failure that is above the first threshold of the MTFF for the type of the hardware component.

The method may also include prior to obtaining the new log segment: obtaining log data for at least one data processing system of the data processing systems; categorizing the log data into a component categorization; generating, for the component categorization, cluster data comprising clusters; and training an inference model using the log data and the cluster data to obtain the inference model.

The data processing system may include one or more hardware components, and categorizing the log data into the component categorization may also include: obtaining component information associated with the data processing system, wherein the component information specifies a component type of each of the one or more hardware components of the data processing system. The log data may be categorized based on the component type of each of the one or more hardware components of the data processing system to obtain the component categorization.

The component information may also include a component provider name, and the log data may also be categorized, in addition to the component type, based on the component provider name.

Generating the cluster data may also include identifying clusters within the component categorization based on an MTFF value of a hardware component, among the one or more hardware components of the data processing system, associated with the component categorization and an actual lifetime expectancy of the hardware component.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, normal wear and tear (e.g., reaching the MTFF of a hardware component), and/or for other reasons, any of these hardware and/or software components may operate in a manner that diverges from nominal (e.g., desired) operation.

The performance and/or lifetime (e.g., the MTFF) of a hardware component of any of data processing systems 102-104 may be influenced by actions (e.g., of a user), and/or by failures of other components (e.g., subsequent failures in the component's failure sequence). For example, an action (or inaction) of a user may cause a component to reach the component's MTFF at a faster rate than if different action(s) had been performed, resulting in a shorter component MTFF (e.g., an actual MTFF different from the component-provider-specified MTFF). These actions, reactions (e.g., to the actions), and any health events associated with the current status of the component and/or data processing system may be recorded and logged (e.g., by data processing systems 100).

When operating, any of these components may generate one or more logs. A log may be a data structure that includes operational information regarding data processing systems 100 such as, for example, descriptions of conditions encountered by a component (e.g., actions, reactions, and/or health events), a time when the condition was encountered, an identifier associated with a condition and/or generator of the log, an indication of a relative level of importance or severity of the encountered conditions, and/or other types of information.

While the logs may include information regarding the current operation of data processing systems 100, the logs may not specify whether portions of the log (e.g., log segments) are indicative of potential undesired operation of the data processing systems 100 and/or components (e.g., indicative of a component's actual MTFF) thereof, and/or may lack other information that may be used to manage data processing systems 100. Rather, the logs may generally include a representation of current and/or past operation of all or a portion of data processing systems 100. Thus, the logs alone may not be useful for proactively addressing potential future undesirable operating conditions (e.g., component failures) of data processing systems 100, and/or causes of the potential undesired operation of data processing systems 100.

Additionally, it may not be clear how any particular portion of log information relates to likely future operation of the data processing systems due to the variety of different types of hardware components of data processing system 100, and variations in the operation of the hardware components.

In general, embodiments disclosed herein may provide systems, devices, and methods for managing data processing systems to reduce the likelihood of the data processing systems operating in an undesired manner. The data processing systems may be managed by predicting one or more component's actual MTFF using sequences from data processing system logs. Based on one or more operational goals (e.g., predicting components' MTFFs to reduce likelihood of data processing system failure in order to minimize the cost of data processing system repair or replacement, etc.), a series of actions may be identified and/or implemented that may be more likely to cause the data processing systems to meet the operation goals.

A system in accordance with an embodiment may include data processing system manager 110. Data processing system manager 110 may manage the operation of data processing systems 100.

To provide its functionality, data processing system manager 110 may (i) obtain logs for the hardware and/or software components of data processing systems 100, (ii) predict the actual MTFFs of one or more components of one or more data processing system based on the logs, (iii) and/or utilize one or more trained inference models to predict the actual MTFFs, to remediate potential undesirable operation and/or reduce the likelihood of data processing systems 100 operating in an undesirable manner in the future thereby improving the likelihood of meeting the operational goals.

By doing so, a system in accordance with embodiments disclosed herein may provide data processing systems having, for example, (i) decreased downtime (e.g., downtime due to unpredicted hardware failure), (ii) improved user experiences by avoiding phantom slowdowns and/or pauses (e.g., due to undesired operating behavior resulting from one or more components reaching their actual MTFFs), (iii) lower cost of ownership and/or maintenance, and/or (iv) improved lifetimes.

Figure 3A:
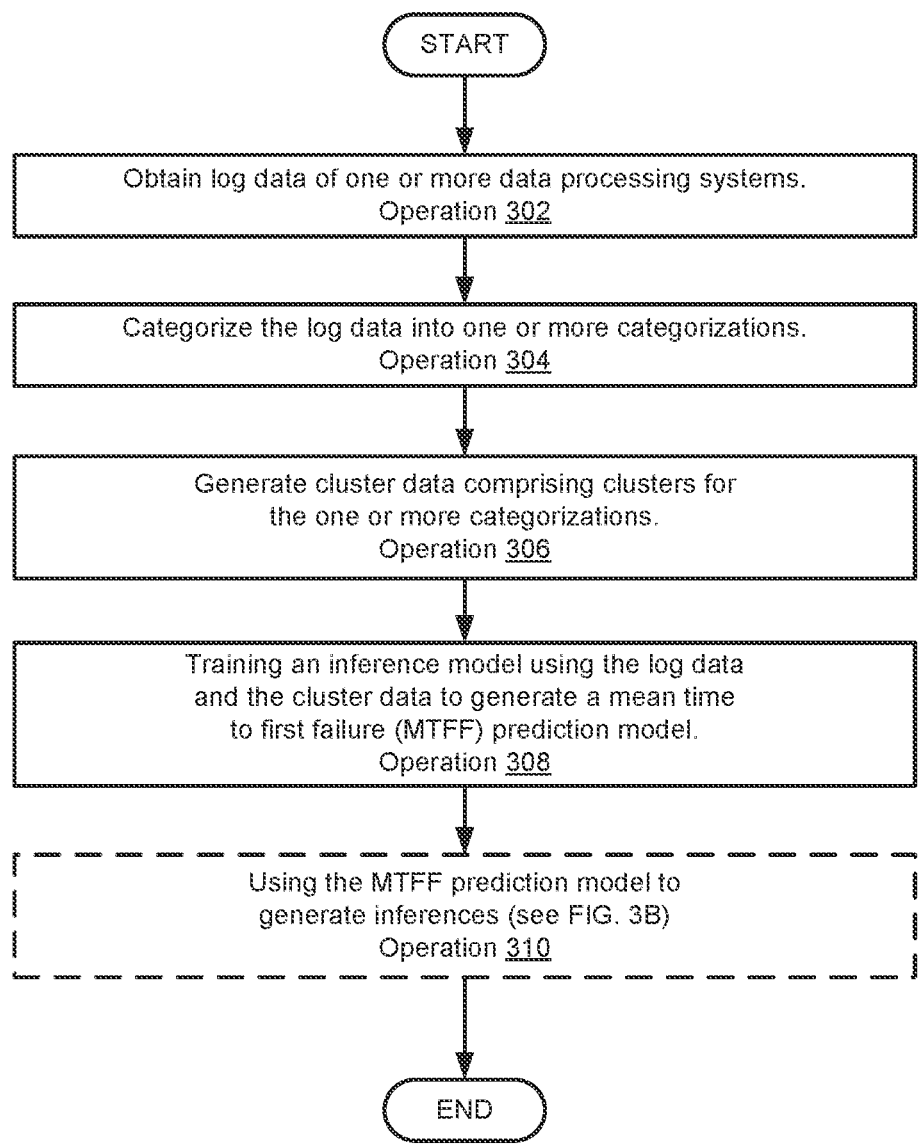
FIG. 3A shows a flow diagram illustrating a method of managing operation of a data processing system in accordance with an embodiment.
Figure 3B:
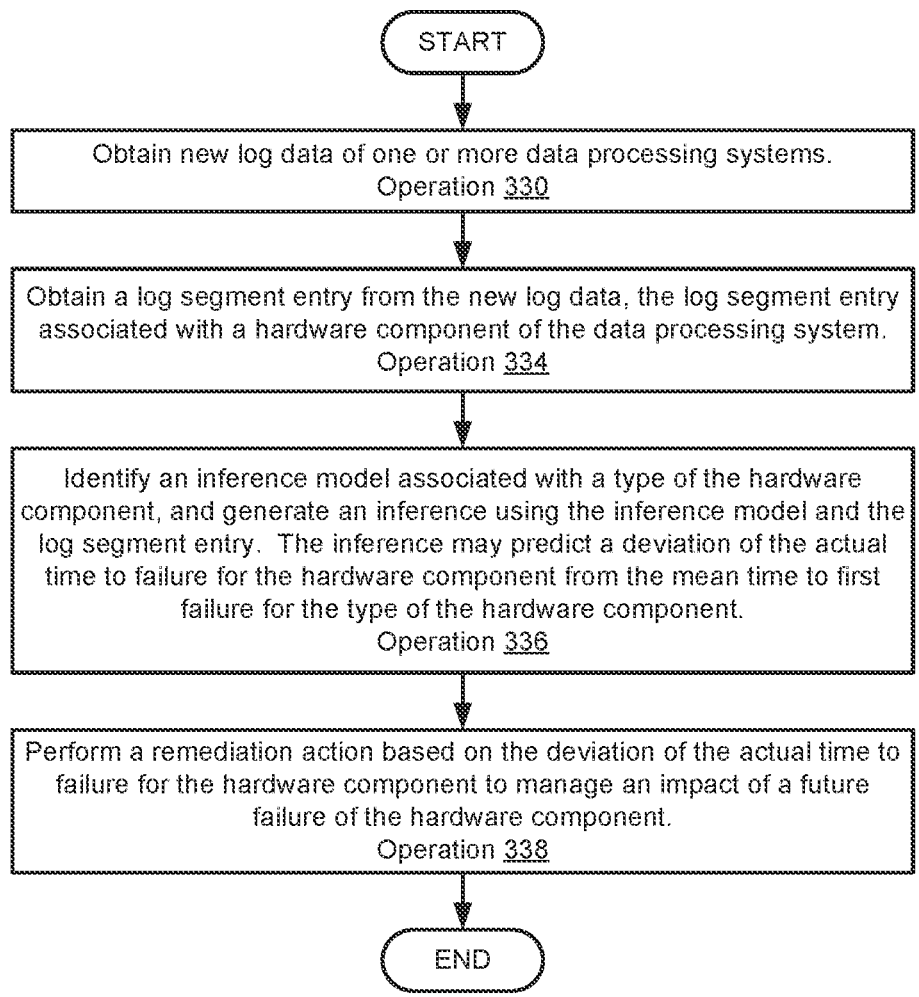
FIG. 3B shows a flow diagram illustrating a method of managing operation of a data processing system in accordance with an embodiment.

When providing its functionality, data processing system manager 110 may perform all, or a portion, of the method and/or actions shown in FIGS. 3A-3B.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a first data flow diagram in accordance with an embodiment is shown. The data flow diagram illustrates a process for generating one or more component categorizations using log data 202 and component information 204. Log files from log data 202 and data making up the component information 204 may be acquired from one or more data processing systems 100. Data making up the component information 204 may also be acquired from external sources (e.g., from a provider of the data processing systems 100 and/or a provider of a specific component included in any of the data processing systems 100).

Log data 202 may be obtained from any number of data processing systems managed by data processing system manager 110. Log data 202 may include any type and quantity of logs, and may include descriptions of actions leading up to an event (e.g., a series of actions), and/or a description of an event (e.g., an undesirable operation and/or a normal operation). Log data 202 may be implemented with structured or unstructured data and may include any number of past logs (e.g., historical logs). A pictorial representation of an example log data 202 is shown and described below in connection with FIG. 2D.

Component information 204 may be obtained directly from the data processing systems (e.g., from one or more service tags of the data processing systems that specify a hardware inventory of the respective data processing systems). Component information 204 may also be obtained from a provider (e.g., a designer, manufacturer, and/or a vendor) of each respective data processing system. For example, the component information 204 of a data processing system may include, but is not limited to: the hardware inventory list of the data processing system; a component type (e.g., a solid-state-drive (SSD), a hard-disk-drive (HDD), a central processing unit (CPU), etc.) of each hardware component included in the hardware inventory list; a name of a provider of each hardware component included in the hardware inventory list; component specification information (e.g., the component-provider-specified MTFF, component parameters, operating conditions of each component, or any other information included in a datasheet and/or user manual generated for a component) of each hardware component included in the hardware inventor list; etc.

Categorization process 206 may collect data such as full log files (e.g., historical log files) from log data 202 and any or all of the data from the component information 204. The full log files may include log segments (e.g., smaller portions of the full log file) that describe a series of actions (e.g., performed by a user), reactions (e.g., of the data processing system to the user actions), and/or health events (e.g., warnings). Each of the log segments may also be associated with: a component (including a component identifier (ID) of the component) of a data processing system; the actual MTFF of the component (also referred to herein as an actual lifetime expectancy of the component); the provider-specified-MTFF of the component, etc. A pictorial representation of an example full log file containing log segments is shown and described below in connection with FIG. 2D.

Categorization process 206 may include categorizing the (e.g., splitting) full log files from log data 202 into one or more component categorizations 208. The categorizing may be done by identifying one or more categories and/or sub-categories using the data available in the component information 204. For example, "component type" may be selected as a category and "provider name" may be selected as a sub-category of the "component type" category (e.g., SDD-Provider X, SDD-Provider Y, HDD-Provider X, etc.). Any combination of categories and sub-categories (based on the available component information) may be used without departing from the scope of embodiments disclosed herein.

Once the full log files are categorized into the component categorizations 208, categorization process 206 may also retrieve the component-provider-specified MTFF from component information 204 and associate the component-provider-specified MTFF with the respective component categorizations. For example, a component categorization for an SDD by provider X will be associated with the component-provider-specified MTFF provided by provider X. As yet another example, for a component categorization associated with multiple providers (e.g., no one specified provider or multiple-specified providers) of a specific component type (e.g., HDD), the component-provider-specified MTFF for all of the multiple providers may be retrieved and prorated (e.g., calculate a prorated average MTFF of the specific component type from the multiple providers).

Each component categorization 208 may be a dataset (e.g., a data structure) that includes data based on the selected categories and/or sub-categories. For example, a component categorization 208 associated with a category of "SSD" and sub-category of "provider X" will include at least: one or more log segments (e.g., from the full log files of the log data 202) associated with the SSD; the actual MTFF of the SDD specified in the one or more log segments; and the component-provider-specified MTFF of the SDD from provider X. A graphical illustration of an example component categorization 208 is shown and described below in connection with FIG. 2E.

Figure 2B:
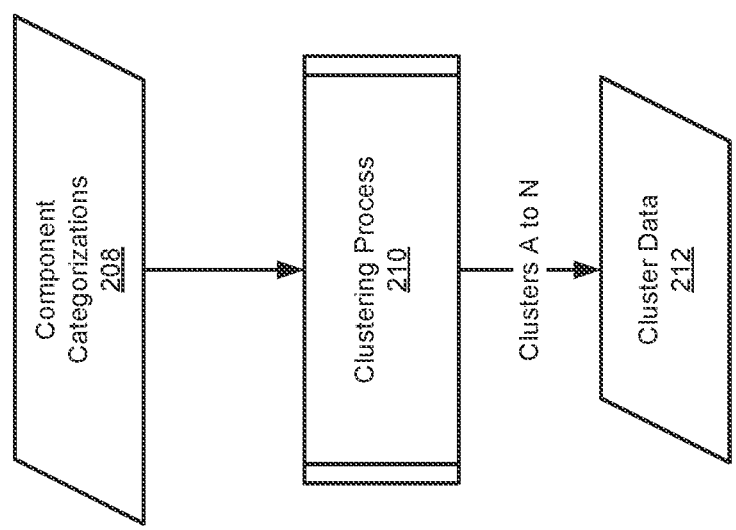
FIG. 2B shows a data flow diagram illustrating a process of obtaining cluster data in accordance with an embodiment.

Turning to FIG. 2B, a second data flow diagram in accordance with an embodiment is shown. The data flow diagram illustrates a process for generating cluster data 212 using one or more of the component categorizations 208 generated in FIG. 2A.

Clustering process 210 may collect one or more of the component categorizations 208 and generate one or more clusters based on the collected component categorization(s). The number of clusters generated may be specified (e.g., predetermined and/or predefined) by a user based on e.g.: data shown in the one or more component categorizations, one or more training labels to be included in training data for an untrained (or trained) inference model, etc.). A range of data covered by each generated cluster may also be specified (e.g., predetermined and/or predefined) by the user. The cluster(s) may also be generated automatically by the data processing system manager 110 based on one or more parameters and/or preferences set by a user. For example, in one example of embodiments disclosed herein (shown and described in more detail below in connection with FIG. 2E), three clusters are generated for the cluster data 212.

Clustering process 210 may generate the cluster(s) using a single component categorization among the component categorizations (208). Alternatively, cluster process 210 may generate the cluster(s) using multiple (more than one but less than all) or all of the component categorizations 208. The generated cluster(s) are stored in as the cluster data 212.

Figure 2C:
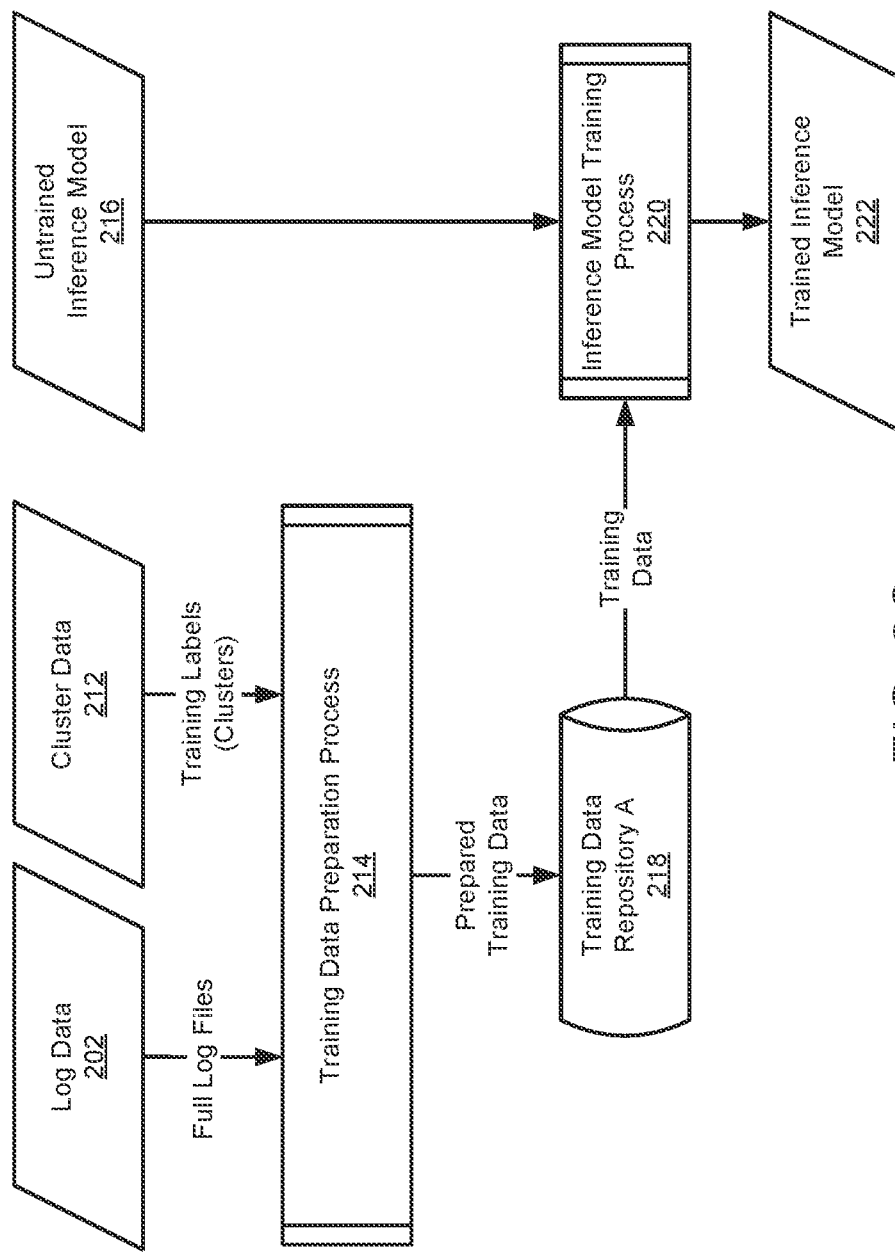
FIG. 2C shows a data flow diagram illustrating a process of obtaining a trained inference model in accordance with an embodiment.

Turning to FIG. 2C, a third data flow diagram in accordance with an embodiment is shown. The data flow diagram may illustrate the generation of inference models in a system similar to that of FIG. 1. The inference models may provide computer implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with artificial neural networks, decision trees, support-vector machines, regression analysis, Bayesian networks, genetic algorithms, and/or any other type of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a mufti-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2C shows training data gathered from log data 202 and cluster data 212 (e.g., the cluster data 212 generated in FIG. 2B). As discussed in FIG. 2A, log files (e.g., full log files) from log data 202 may be acquired from one or more data processing systems 100.

Training data preparation process 214 may collect training data such as the full logs files from log data 202 and the cluster(s) from the cluster data 212. Training data preparation process 214 may further include verifying and/or performing data labeling (e.g., associating two or more data samples from the collected training data). For example, a log segment included in the full log files of the log data 202 may be associated with a cluster included in the cluster data 212.

An example pictorial representation of the association of the log segment(s) with the cluster(s) is shown and described below in connection with FIG. 2E.

However, labeled training data may not always be reliable (e.g., a data sample may be improperly labeled by a user) and, if incorrectly labeled training data is used to train an inference model, the trained inference model may generate inaccurate inferences. Thus, the quality of training data labels may be verified as part of training data preparation process 206. For example, unreliable labels may be removed from a portion of training data and that portion of training data may be implemented as unlabeled data during training.

The prepared training data from training data preparation process 214 may be stored in training data repository A 218. Any of the training data from training data repository A 218 may relate log segments from log data 202 to clusters from cluster data 212, thereby including any portion of labeled data. Training data may also include unlabeled data and, thus, an association between log segments of the log data 202 and clusters of the cluster data 212 may not be known.

Training data repository A 218 may include any number of training datasets. The training datasets may be used to train an inference model to generate a prediction (e.g., an inference) regarding an actual MTFF of (e.g., a predicted actual life expectancy of) one or more components of the data processing systems 100, based on ingested data (e.g., log data 202).

Untrained inference model A 216 may be trained using training data (e.g., from training data repository A 218). To do so, untrained inference model A 216 and the training data may be input to inference model training process 220.

Inference model training process 220 may employ machine-learning techniques such as supervised learning (e.g., for labeled training data), and/or unsupervised learning (e.g., for unlabeled data) to produce any number of trained inference models, including trained inference model 222 (e.g., a component MTFF prediction model). The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 220.

Trained inference model 222 may attempt to map an input dataset to a desired output dataset (e.g., generate inferences). The inferences may be generated from ingested data that may differ from the training data that was used to train trained inference model 222. For example, trained inference model 222 may be used to analyze new logs (e.g., real-time logs) from any of the data processing systems 100 and may predict the MTFF of components of the data processing systems 100 using the new logs.

For example, trained inference model 222 may be a classification inference model and may classify log files from log data 202 based on whether the log is similar (e.g., within a predetermined similarity threshold set by a user) to another log associated with a training label (e.g., any of the clusters). In one example of embodiments disclosed herein, the predicted MTFF may indicate when a component (e.g., a hardware component) of the data processing system is predicted to fail (e.g., may classify a component lifetime (the predicted MTFF) of the component as one of a normal lifetime, a negative outlier lifetime, or a positive outlier lifetime).

Over time, the trained inference models may need to be updated for a variety of reasons. For example, the trained inference models may become inaccurate, may not provide desired types of inferences, etc. Consequently, trained inference models (e.g., trained inference model A 222) may be periodically replaced and/or updated. Thus, as illustrated in FIG. 2C, the system of FIG. 1 may obtain and/or train inference models used for the detection of future failures (namely, predicting a MTFF of components of the hardware processing systems 100) based on log data 202 of the data processing systems 100, categorizing components into different clusters (e.g., defined by cluster data 212, which may cluster based on early, normal, or late failures when compared to the MTFF) based on a log data from the not-yet-failed, etc.

Turning to FIG. 2D, an example of a full log file showing failure information in accordance with an embodiment is shown. Data table 250 shows five examples (e.g., each row showing unique data entries) of failure information associated with one component (e.g., component C1) of a data processing system. The failure information includes at least one or more log segments associated with component C1, an actual MTFF of component C1 (e.g., shown as a value represented in a number of days), and a provider-specified-MTFF of component C1 (e.g., shown as a value represented in a number of days). The component identifier (ID) may indicate a component type (e.g., component C1 is an SSD, HDD, or the like). To determine the actual MTFF, the duration of time between when a component was purchased (or a date that the data processing system containing the component first became operational) and the date that the component failed completely (e.g., the component can no longer be repaired) may be subtracted from a date provided by the manufacturer of the component (e.g., the manufacture date and/or ship date of the component).

It will be appreciated that the example shown in FIG. 2D is simplified for the sake of clarity and that a larger number of data entries may be encountered in practice (e.g., data table 250 showing the failure information may include any number of data entries).

The components of FIG. 1 may perform methods to collect failure information as a collection of data entries as shown in data table 250 of FIG. 2D. The failure information collected and/or stored by one or more data processing systems may be used to generate the component categorizations 208 and cluster data 212 described above in connection to FIGS. 2A and 2B, respectively.

Figure 2E:
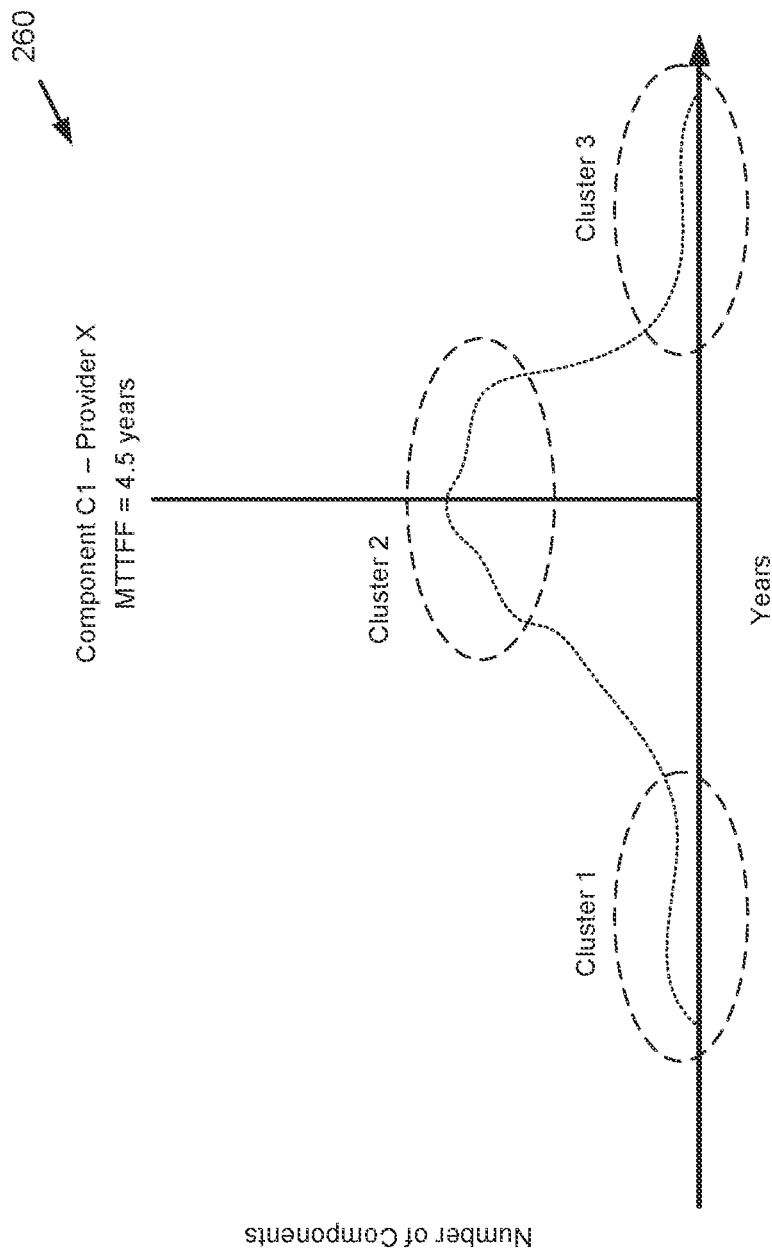
FIG. 2E shows an example of cluster data in accordance with an embodiment.

Turning to FIG. 2E, an example component categorization in accordance with an embodiment is shown (for the sake of clarity) in graphical form as component categorization graph 260. The component categorization graph 260 is generated based on the selection of category "component type" and sub-category "provider." In particular, the component categorization graph 260 shows a component categorization (of the full log data) for component C1 from provider X where the provider-specified-MTFF for component C1 is 4.5 years. The x-axis of the component categorization graph 260 shows a time value (e.g., number of years) while the y-axis shows a quantity (e.g., number of components recorded with specific actual MTFFs). The component categorization graph 260 shown in FIG. 2E may be based on the information stored in data table 250 shown in FIG. 2D. Although a graph is shown in FIG. 2E, the generation of a graph is not necessary in the processes of one or more embodiments disclosed herein.

As additionally shown in FIG. 2E, clusters (e.g., cluster 1, cluster 2, and cluster 3) may be generated for the component categorization shown in the component categorization graph 260. In this example, the three clusters are generated based on three training labels (e.g., a normal lifetime, a negative outlier lifetime, and a positive outlier lifetime) to be used in training one or more inference models (e.g., untrained inference model A 216 and/or trained inference model A 222) where cluster 1 covers training label "negative outlier lifetime" (e.g., covering a predetermined range of values that are lower than the provider-specified-MTFF of component C1 by provider X), cluster 2 covers training label "normal lifetime" (e.g., covering a predetermined range of values that are lower than and greater than the provider-specified-MTFF of component C1 by provider X), and cluster 3 covers "positive outlier lifetime" (e.g., covering a predetermined range of values that are greater than the provider-specified-MTFF of component C1 by provider X). As discussed above, any number of clusters may be generated for the component categorization.

Figure 2F:
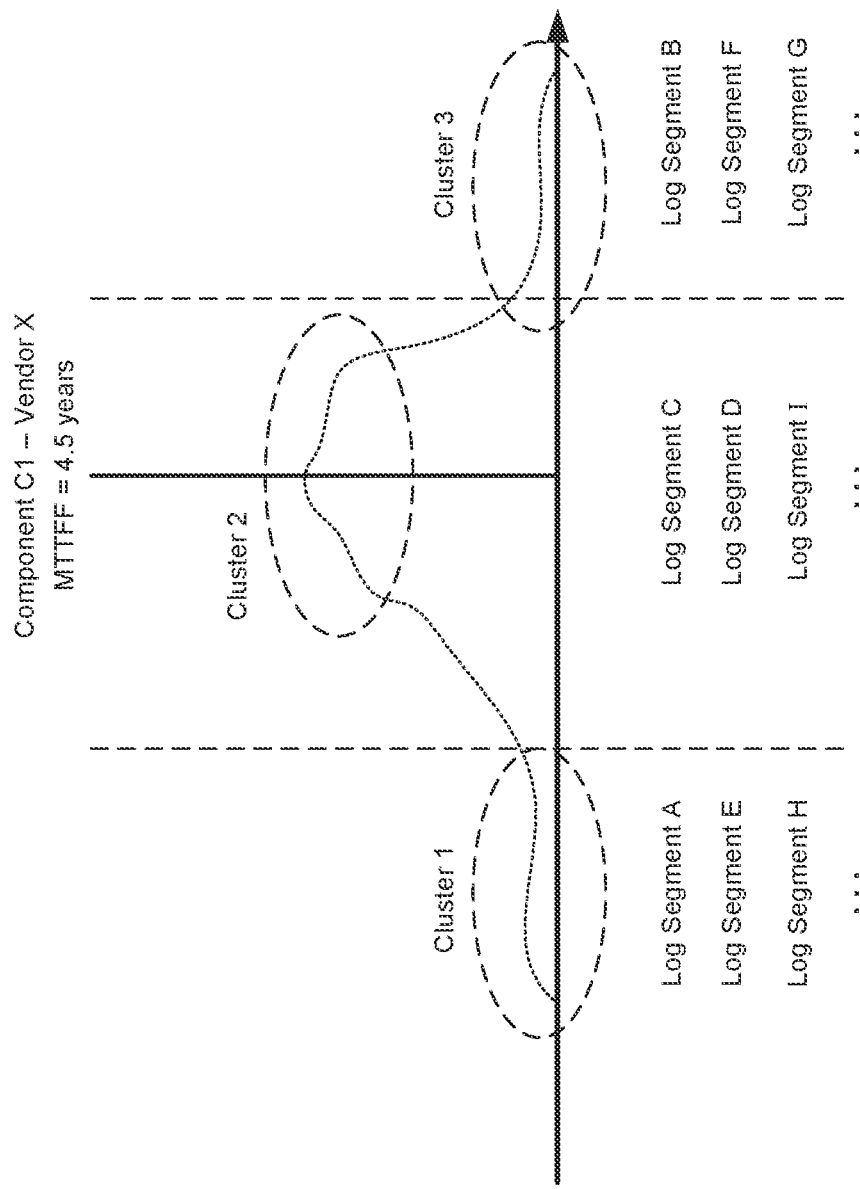
FIG. 2F shows an example of training data in accordance with an embodiment.

Turning to FIG. 2F, an example association of the clusters (e.g., training labels) with the log data (e.g., log segments) to be used as the training data for the inference model(s) in accordance with an embodiment is shown. In particular, as shown in FIG. 2E, cluster 1 includes at least Log Segments A, E, and H that are associated with an instance of component C1 having an actual MTFF within the range covered by cluster 1. Cluster 2 includes at least Log Segments C, D, and I associated with an instance of component C1 by provider X having an actual MTFF within the range covered by cluster 2. Cluster 3 includes at least Log Segments B, F, G that are associated with an instance of component C1 having at an actual MTFF within the range covered by cluster 3. These associations shown in FIG. 2E may then be used as training data for the inference model to classify newly received log segments with a classification (e.g., label) associated with one of clusters 1, 2, or 3.

Accordingly, the trained inference models may be used to ingest log segments (from components of a particular type) and output inferences indicating whether a component associated with the log is likely to fail ahead of the MTFF, near the MTFF, or after the MTFF. A management system may use such inferences to manage data processing systems. For example, a management system may automatically prepare for component failures well ahead of the MTFF if actual components exhibit logs indicating early failure is likely. In contrast, the management system may delay preparation for components failures beyond what normally based on the MTFF if actual components exhibit late logs indicating that late failure of the components is likely.

FIGS. 3A-3B show flow diagrams illustrating a method of managing operation a data processing system (e.g., predicting an MTFF of one or more components of a data processing system) in accordance with an embodiment. The method may be performed by the system of FIG. 1. Any of the operations described with respect to FIG. 4 may be performed in different orders, skipped, repeated, optional (e.g., when shown in broken lines), and/or be performed in a parallel or partially overlapping in time manner.

Starting with FIG. 3A, at operation 302, log data may be obtained from one or more data processing systems. The log data may be obtained by (i) receiving the log data from the data processing systems, (ii) reading the log data from the data processing systems, and/or (iii) reading the log data from another source (e.g., an external storage device storing the log data). As described with respect to FIGS. 2A and 2D, the log data may include historical failure information including one or more log segments each associated with a component of the one or more data processing systems. Each log segment of the log data may be associated with an actual MTFF and a provider-specified-MTFF of the component.

At operation 304, the log data is categorized into one or more categorization (e.g., component categorizations as described with respect to FIG. 2B). In particular, categorizing the log data into the component categorization(s) may involve determining one or more categories and/or sub-categories from component information obtained directly from the data processing systems (e.g., via a service tag of each data processing system) and/or obtained indirectly from the data processing systems through a provider of the data processing system. Each component categorization includes data (e.g., the actual MTFF of each instance of the component, the provider-specified-MTFF, the component type, the name of the provider, etc.) associated with the components covered by the determined categories and/or sub-categories.

At operation 306, cluster data comprising clusters is generated for the one or more categorizations. As discussed above, the number of clusters generated may be specified (e.g., predetermined and/or predefined) by a user based on e.g.: data shown in the one or more component categorizations, one or more training labels to be included in training data for an untrained (or trained) inference model, etc.). A range of data covered by each generated cluster may also be specified (e.g., predetermined and/or predefined) by the user. The cluster(s) may also be generated automatically by the data processing system manager 110 based on one or more parameters and/or preferences set by a user. For example, in the example shown connection with above FIG. 2E, three clusters are generated for the cluster data.

For example, three clusters may be generated in operation 306. The three clusters may include: a first cluster covering a predetermined range of values that are lower than and greater than the provider-specified-MTFF of component associated with the component categorization; a second cluster covering a predetermined range of values that are lower than the provider-specified-MTFF of component associated with the component categorization; and a third cluster covering a predetermined range of values that are greater than the provider-specified-MTFF of component associated with the component categorization.

At operation 308, an inference model is trained using the log data and the cluster data to generate an MTFF prediction model. The training of the inference model is discussed above in connections with FIGS. 2C and 2F. In particular, the inference model is trained such that the inference model can be used to predict an MTFF of components associated with one or more newly obtained log data (namely, log segments within the log data).

The method may end following operation 308. Alternatively, the method may proceed to operation 310 where the MTFF prediction model obtained in operation 308 may be used to generate inferences using the one or more newly obtained log data (namely, log segments within the log data), which is discussed in more detail in the operations of FIG. 3B.

In particular, turning to FIG. 3B, at operation 330, new log data of one or more data processing systems may be obtained (e.g., similarly to the obtaining of the log data in operation 3A).

At operation 334, a log segment entry is obtained from the new log data obtained in operation 330. The log segment entry is associated with a hardware component of at least one of the data processing system.

At operation 336, an inference model associated with the type of the hardware component is identified. The inference model may be identified using associations between different inference models and types of component. An inference may be generated using the inference model and the log segment entry. The inference may indicate a deviation (e.g., increase, reduction, or stay the same) of a predicted actual time to failure for the hardware component from the MTFF for the type of the component. To obtain the inference, the log segment entry obtained in operation 334 may be fed (e.g., ingested as an input) into the inference model. Once ingested as an input, an inference may be generated. The inference may specify a categorization for the hardware component with respect to a MTFF for the type of the hardware component.

In operation 338, a remediation action based on the deviation of the actual time to failure for the hardware component may be performed to manage an impact of a future failure of the hardware component. The remediation action may include, for example, (i) replacing the hardware component, (ii) disabling the hardware component, (iii) modifying operation of the host data processing system to reduce an impact of a future failure of the hardware component, (iv) sending notifications regarding the deviation to administrators or other persons or entities, and/or other types of actions that may manage the impact of the future failure of the hardware component. A performance of the remediation action may be scheduled based on the deviation and the MTFF for the type of the hardware component. For example, if the deviation is an earlier failure, then the remediation action may be scheduled for performance earlier than would otherwise be scheduled based on the MTFF. In contrast, if the deviation is a later failure, then the remediation action may be scheduled for performance later than would otherwise be scheduled based on the MTFF.

The method may end following operation 338.

Thus, as illustrated above, embodiments disclosed herein may provide systems and methods usable to manage data processing systems though the prediction of an MTFF of one or more components of the data processing systems. Trained inference models may be implemented to analyze log segments obtained from data processing systems, and to predict component failures (e.g., the predicted MTFF) thereof. The predicted component failures may be presented in the form of a classification (or as a quantitative value) and may be used to manage future component failures according to operational goals.

Thus, embodiments disclosed herein may provide an improved computing device that is able to extract useful information from log data, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 4:
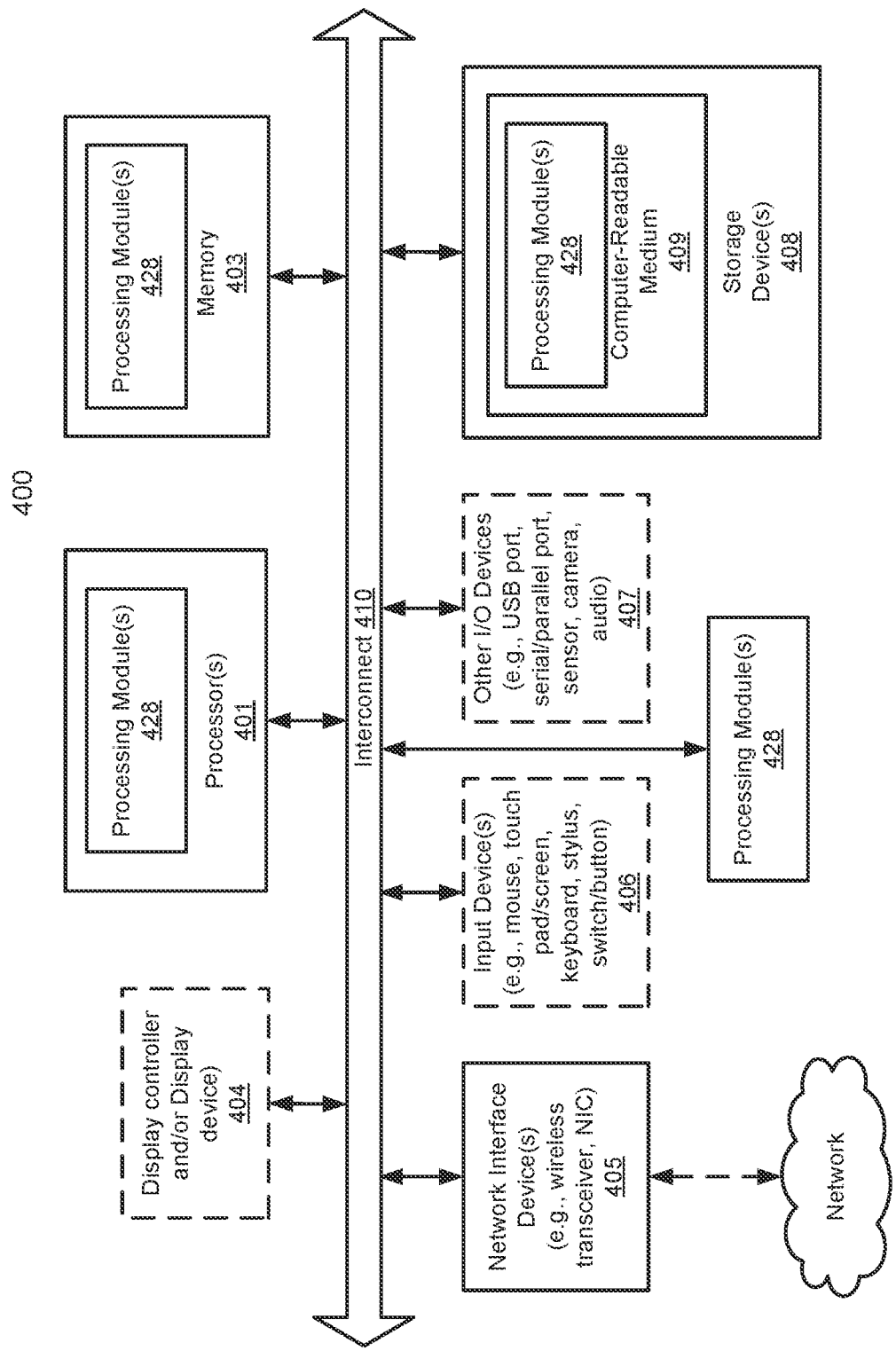
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with an optional graphics subsystem, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device 404 of optional graphics subsystem), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data processing systems, comprising:
    obtaining a new log segment for a hardware component of a data processing system of the data processing systems;
    identifying a type of the hardware component;
    identifying an inference model associated with the type of the hardware component;
    obtaining, using the inference model and the log, an inference indicating a predicted deviation of the actual time to failure for the hardware component from a mean time to first failure (MTFF) for the hardware component; and
    performing a remediation action based on the deviation of the actual time to failure for the hardware component to manage an impact of a future failure of the hardware component.

2. The method of claim 1, wherein performing the remediation action comprises:
    in a first instance performing the remediation action where the deviation is a negative outlier lifetime:
        identifying a nominal scheduling for replacement of the hardware component ahead of the MTFF; and
        scheduling replacement of the hardware component ahead of the nominal scheduling.

3. The method of claim 2, wherein performing the remediation action comprises:
    in a second instance of performing the remediation action where the deviation is a positive outlier lifetime:
        identifying a nominal scheduling for replacement of the hardware component ahead of the MTFF; and
        scheduling replacement of the hardware component after the nominal scheduling.

4. The method of claim 3, wherein the inference model is based on training data that comprises records, each record comprising:
    a log sequence for one of multiple hardware components of the type of the hardware component that have previously failed; and
    a cluster of clusters.

5. The method of claim 4, wherein the clusters are based on a clustering of second records for a type of hardware component, each the second record comprising:
    the log sequence for the one of multiple hardware components of the type of the hardware component that have previously failed; and
    an actual time to first failure for the one of multiple hardware components.

6. The method of claim 5, wherein the cluster comprise at least three clusters, wherein a first of the three clusters comprises a first portion of the second records that each have an actual time to first failure that is less than the MTFF for the type of the hardware component below a first threshold, a second of the three clusters comprises a second portion of the second records that each have an actual time to first failure that is within the first threshold of the MTFF for the type of the hardware component, and a third of the three clusters comprises a third portion of the second records that each have an actual time to first failure that is above the first threshold of the MTFF for the type of the hardware component.

7. The method of claim 1, further comprising:
    prior to obtaining the new log segment:
        obtaining log data for at least one data processing system of the data processing systems;
        categorizing the log data into a component categorization;
        generating, for the component categorization, cluster data comprising clusters; and
        training an inference model using the log data and the cluster data to obtain the inference model.

8. The method of claim 7, wherein:
    the data processing system comprises one or more hardware components, and
    categorizing the log data into the component categorization further comprises:
        obtaining component information associated with the data processing system, wherein the component information specifies a component type of each of the one or more hardware components of the data processing system,
        wherein the log data is categorized based on the component type of each of the one or more hardware components of the data processing system to obtain the component categorization.

9. The method of claim 8, wherein:
    the component information further comprises a component provider name, and
    the log data is further categorized, in addition to the component type, based on the component provider name.

10. The method of claim 9, wherein generating the cluster data further comprises:

identifying clusters within the component categorization based on an MTFF value of a hardware component, among the one or more hardware components of the data processing system, associated with the component categorization and an actual lifetime expectancy of the hardware component.

11. A non-transitory machine-readable medium having instructions stored therein, which when executed by a processor, cause the processor to perform operations for managing data processing systems, the operations comprising:
obtaining a new log segment for a hardware component of a data processing system of the data processing systems;
identifying a type of the hardware component;
identifying an inference model associated with the type of the hardware component;
obtaining, using the inference model and the log, an inference indicating a predicted deviation of the actual time to failure for the hardware component from a mean time to first failure (MTFF) for the hardware component; and
performing a remediation action based on the deviation of the actual time to failure for the hardware component to manage an impact of a future failure of the hardware component.

12. The non-transitory machine-readable medium of claim 11, wherein performing the remediation action comprises:
in a first instance performing the remediation action where the deviation is a negative outlier lifetime:
identifying a nominal scheduling for replacement of the hardware component ahead of the MTFF; and
scheduling replacement of the hardware component ahead of the nominal scheduling.

13. The non-transitory machine-readable medium of claim 12, wherein performing the remediation action comprises:
in a second instance of performing the remediation action where the deviation is a positive outlier lifetime:
identifying a nominal scheduling for replacement of the hardware component ahead of the MTFF; and
scheduling replacement of the hardware component after the nominal scheduling.

14. The non-transitory machine-readable medium of claim 13, wherein the inference model is based on training data that comprises records, each record comprising:
a log sequence for one of multiple hardware components of the type of the hardware component that have previously failed; and
a cluster of clusters.

15. The non-transitory machine-readable medium of claim 14, wherein the clusters are based on a clustering of second records for a type of hardware component, each the second record comprising:
the log sequence for the one of multiple hardware components of the type of the hardware component that have previously failed; and
an actual time to first failure for the one of multiple hardware components.

16. The non-transitory machine-readable medium of claim 15, wherein the cluster comprise at least three clusters, wherein a first of the three clusters comprises a first portion of the second records that each have an actual time to first failure that is less than the MTFF for the type of the hardware component below a first threshold, a second of the three clusters comprises a second portion of the second records that each have an actual time to first failure that is within the first threshold of the MTFF for the type of the hardware component, and a third of the three clusters comprises a third portion of the second records that each have an actual time to first failure that is above the first threshold of the MTFF for the type of the hardware component.

17. The non-transitory machine-readable medium of claim 11, further comprising:
prior to obtaining the new log segment:
obtaining log data for at least one data processing system of the data processing systems;
categorizing the log data into a component categorization;
generating, for the component categorization, cluster data comprising clusters; and
training an inference model using the log data and the cluster data to obtain the inference model.

18. The non-transitory machine-readable medium of claim 17, wherein:
the data processing system comprises one or more hardware components, and
categorizing the log data into the component categorization further comprises:
obtaining component information associated with the data processing system, wherein the component information specifies a component type of each of the one or more hardware components of the data processing system,
wherein the log data is categorized based on the component type of each of the one or more hardware components of the data processing system to obtain the component categorization.

19. The non-transitory machine-readable medium of claim 18, wherein:
the component information further comprises a component provider name, and
the log data is further categorized, in addition to the component type, based on the component provider name.

20. A data processing system manager, comprising:
a processor; and
a memory coupled to the processor to store instructions, which when executed by the processor, cause the processor to perform operations for managing data processing systems, the operations comprising:
obtaining a new log segment for a hardware component of a data processing system of the data processing systems;
identifying a type of the hardware component;
identifying an inference model associated with the type of the hardware component;
obtaining, using the inference model and the log, an inference indicating a predicted deviation of the actual time to failure for the hardware component from a mean time to first failure (MTFF) for the hardware component; and
performing a remediation action based on the deviation of the actual time to failure for the hardware component to manage an impact of a future failure of the hardware component.

* * * * *